United States Patent [19]

Larsson

[11] Patent Number: 5,681,464
[45] Date of Patent: Oct. 28, 1997

[54] FILTER FOR CROSS-FLOW FILTRATION

[75] Inventor: Ebbe L. T. Larsson, Genarp, Sweden

[73] Assignee: Alfa Laval Brewery Systems AB, Lund, Sweden

[21] Appl. No.: 582,988

[22] PCT Filed: Jul. 8, 1994

[86] PCT No.: PCT/SE94/00675

§ 371 Date: Apr. 10, 1996

§ 102(e) Date: Apr. 10, 1996

[87] PCT Pub. No.: WO95/03109

PCT Pub. Date: Feb. 2, 1995

[30] Foreign Application Priority Data

Jul. 20, 1993 [SE] Sweden .................. 9302454

[51] Int. Cl.$^6$ .................................................. B01D 63/00
[52] U.S. Cl. .................. 210/321.84; 210/231; 210/232; 210/456; 210/486
[58] Field of Search .................. 210/490, 500.25, 210/500.36, 175, 321.75, 321.84, 510.1, 456, 488, 641, 232, 486, 231

[56] References Cited

U.S. PATENT DOCUMENTS

| | | | |
|---|---|---|---|
| 2,712,386 | 7/1955 | Jones et al. | 210/321.75 |
| 3,340,186 | 9/1967 | Weyl | 210/321.84 |
| 4,726,900 | 2/1988 | Keskinen et al. | 210/488 |
| 4,797,211 | 1/1989 | Ehrfeld et al. | 210/500.25 |
| 5,085,772 | 2/1992 | Busch-Sørensen | 210/321.25 |
| 5,100,544 | 3/1992 | Izutani et al. | 210/175 |
| 5,104,532 | 4/1992 | Thompson et al. | 210/321.75 |
| 5,429,742 | 7/1995 | Gutman et al. | 210/321.75 |

FOREIGN PATENT DOCUMENTS

WO 92/03216 3/1992 WIPO.
WO 92/06774 4/1992 WIPO.

*Primary Examiner*—Ana Fortuna
*Attorney, Agent, or Firm*—Fish & Richardson P.C.

[57] ABSTRACT

A filter for cross-flow filtration of a fluid containing suspended or emulsified substance is constructed of equally dimensioned plates. Between the plates there are passages for retentate and permeate flow. The plates have in- and outlet openings to form collection channels, through which unfiltered fluid is led to and retentate and permeate is led away from the passages. There are plates (1) (membrane plates) comprising a membrane of material which is chemically and physically inert to the fluid, which membrane has a pore size of 0.1-50 μm through which membrane the permeate passes. There are also plates (2) which are impervious to the fluid. Retentate (6) and permeate (8) passages are formed between the plates (1, 2), which all have three openings (3, 4, 5). The retentate passages (6) are connected to the channel for unfiltered fluid and to the channel for retentate and sealed against the channel for permeate. The permeate passages (8) are connected to the channel for permeate and sealed against the channels for unfiltered fluid and for retentate.

13 Claims, 3 Drawing Sheets

FILTER FOR CROSS-FLOW FILTRATION

FIELD OF THE INVENTION

The present invention relates to a filter intended for cross-flow filtration of a fluid containing suspensed or emulsified substances, which filter is constructed of equally dimensioned plates between which there are formed passages for retentate and permeate flow. The passages are sealed by way of edge packings and the plates have in- and outlet openings to form collection channels, through which unfiltered fluid is led to and retentate och permeate are led away from the passages.

BACKGROUND OF THE INVENTION

The technology for cross-flow filtration started to grow in connection with the development regarding reverse osmosis in the beginning of the sixties. Since then this technique has been used both for reverse osmosis as ultra filtration and microfiltration. The pore size of the membranes which are used for these purposes varies with the smallest pore size being used in membranes for reverse osmosis and the largest being used in microfiltration membranes. In cross-flow filtration the entering stream is divided into two flows usually called permeate and concentrate or retentate. The permeate is the fraction which has passed the membrane while the retentate is the fraction which has been enriched with the emulsified or suspensed substance which has not passed the membrane.

Micro- and particle filtration are the newest of these filtration techniques. This type of membrane filtration is used today in many purposes within the food industry, both for purification of products as well as for regeneration of waste and by-products. Microfiltration is also used to produce pure water.

Cross-flow filters for microfiltration are today usually formed as tubes, "plate and frame" and spirals.

Within the brewery industry one has for a long time looked for a substitute for the kieselguhr filters which have been used for the final purification of beer, since kieselguhr is considered to bring about both contaminations of the environment and damages for the brewery personnel working with the filters.

A microfilter which has been used for beer filtration is described in GB 2 176 715. This filter consists of ceramic membranes in the shape of channels in a body of a more coarse ceramic material.

One problem with filtration of beer is that the filters easily get clogged and only may be used during short operation times. One way of preventing clogging of the microfilter is to use permeate for cleaning of the same. The permeate is then pressurized during short periods in such a way that it is forced to pass the membrane from the permeate side to the concentrate side. In this way the operation times may be extended.

In order to increase the capacity of the microfilters the liquid which is to be treated in the filter is brought to circulate in a circulation path over the filter. The disadvantage with this is that the energy consumption is high, since large flows are pumped around in the network. The liquid may also be subjected to a non-desired heating. Liquid which is not yet treated is added to the circulation path and brings about a dilution of the retentate.

SUMMARY OF THE INVENTION

According to the present invention there is now suggested a new design of a filter for cross-flow filtration intended especially for micro- or particle filtration. The filter according to the invention has a large membrane area but a small need for space and is mainly characterized in that there are plates (membrane plates) comprising a membrane of material which is chemically and physically inert to the fluid. This membrane has a pore size of 0.1–50 µm and the permeate passes this membrane. There are also plates which are impervious to the fluid. Retentate and permeate passages are formed between the plates, which plates all have three openings. The retentate passages are connected to the channels for unfiltered fluid and to the channel for retentate and sealed against the channel for permeate. The permeate passages are connected to the channel for permeate and sealed against the channels for unfiltered fluid and for retentate. The impervious plates are provided with a corrugation pattern increasing the turbulence in the retentate passages. A restriction is arranged in the outlet from the collection channel for permeate, which restriction constitutes such a hindrance for the permeate flow that the permeate passages are kept filled with fluid.

By using a membrane material which is chemically and physically inert, the risk for blockage of the filter is considerably reduced. When fluids comprising complex compounds as beer, milk, juice or wine are subjected to cross flow filtration there is otherwise a risk that the compounds react or bind to the membrane material, which complicates or even makes a cleaning impossible. The risk of clogging is also diminished in that the permeate passages are kept filled with permeate, which means that the pressure drop over the membrane may be kept low with the help of a counter pressure system.

The filter is with advantage designed such that both the permeate and the retentate passages are formed between a membrane plate and an impervious plate. In this way membrane plates and impervious plates alternate with each other. Of course it is also possible to arrange the plates such that two retentate passages surround a common permeate passage.

A filter according to the invention comprises with advantage membrane material with a pore size of 0.2–10 µm. Such a filter is suitably used for purification of beer, juice and wine by microfiltration. If membrane material with a larger pore size, particle filtration, is used, more material passes the membrane.

Membrane materials which are inert and suitable to use in the filter according to the invention consists of sintered metallic material, glass or poly-fluoroethylene, for example Teflon (R). A sintered ceramic material may also be used.

The membrane material may suitably consist of sintered stainless steel which is approved for use for food if the filter is used in food applications.

The plates in the filter may be designed in many ways, e.g. circular or oval, but have with advantage a square or rectangular shape with the openings situated in the edges of the square or the rectangle. Such an arrangement gives a large membrane area with small external dimensions.

By tightening the plates and the intermediate edge packings in a frame the forces which keep the filter together are distributed over its whole area according to the invention.

The impervious plates are provided with a corrugation pattern which may be designed in many ways. The pattern may have the shape of ridges and grooves or depressions in various configurations. This increases the turbulence in the passages and controls the pressure drop in the same. The plates also obtain a greater stability.

The membrane plates consist to the largest part of its area of membrane material. The openings are suitably arranged outside this part. The cross section of the plate may be homogeneous, i.e. consist of a membrane material with the same pore size over the whole cross section. The plate may also be constructed of two or several layers, thin membrane layers, which work as hindrance to the suspensed or emulsified substance/substances and a supporting structure with a larger pore size. In both these embodiments the plates are self-supporting.

In order to increase the turbulence in the retentate and permeate passages also the plates which function as membrane plates may be provided with a corrugation pattern. It is also possible to arrange both kinds of plates such that they abut each other which further increases the turbulence in the passages.

The filter may also be built up in sections where membrane plates with different pore sizes may be present in different parts according to requirements. In this way particles and molecules with the greater size may be separated off in a first section, while in a second section smaller particles may be separated off.

In the filter according to the invention sections for heating and/or cooling of the fluid may be included. It is also possible to provide the filter with specially designed intermediate plates through which the fluid may be led out from the filter and made to pass a pump which increases the pressure of the fluid before it is returned to the filter.

A filter according to the invention is shown very schematically in the attached drawings, which show an embodiment chosen as an example only.

SUMMARY OF THE INVENTION

In FIGS. 1 and 2 there are shown cross-sections of a filter according to the invention.

In FIG. 3 there is shown a split open view of the plates in the filter in FIG. 1 and 2.

In FIG. 4 there is shown how the filter according to the invention may be used in the plant when the fluid is cooled prior to or during the filtration. In FIG. 5 the arrangement of a number of filter sections are shown in a pasteurization plant.

DETAILED DESCRIPTION

Figure 1:
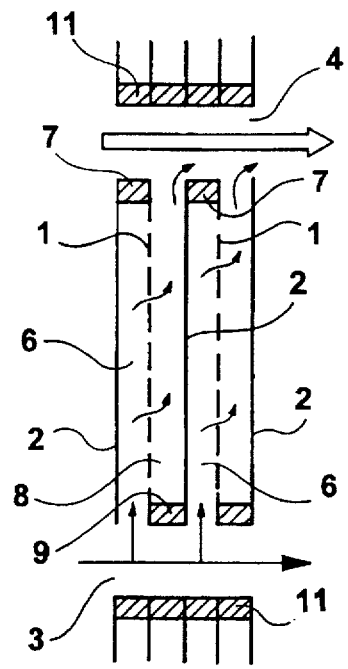
Figure 2:
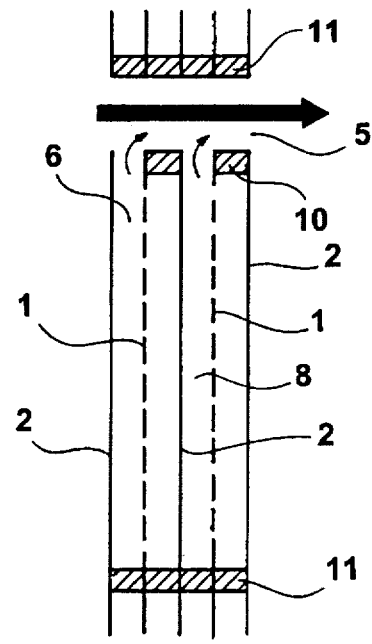

In FIGS. 1 and 2 there are shown membrane plates 1 and impervious plates 2.

Figure 3:
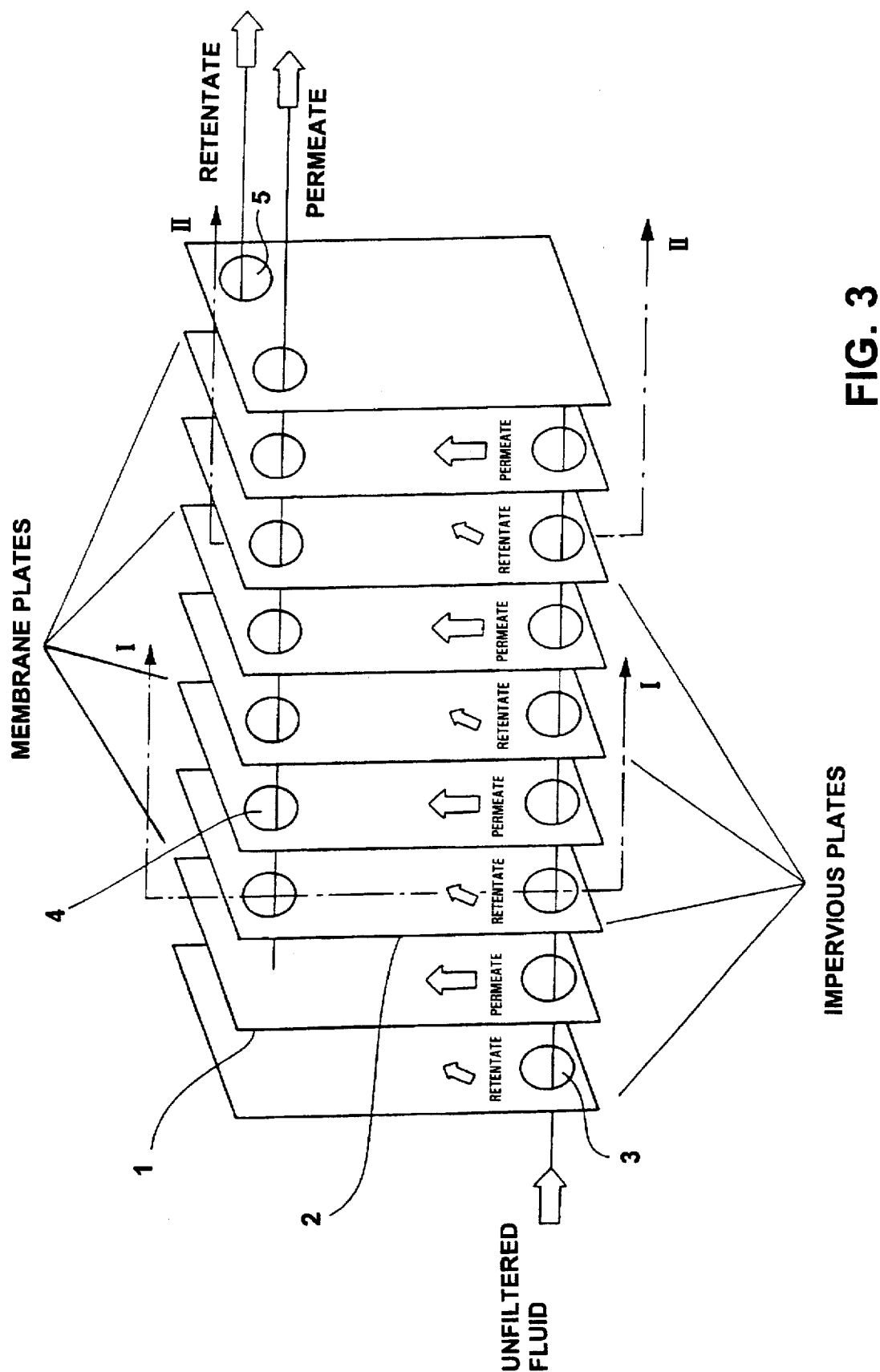

In FIG. 1, which is a cross-section of the filter along the line II—II in FIG. 3, there are shown the inlet openings 3 in the lower, front parts of both the plates 1,2 (as seen in FIG. 3). These inlet openings form the channel for unfiltered fluid. At the upper, front part of the plates there are outlet openings 4 forming the channel for permeate.

In FIG. 2, which is a cross-section of the filter along the line II—II in FIG. 3 there are shown the outlet openings 5 in the upper, rear part in the plates as seen in FIG. 3. The membrane plates are provided with a membrane 6 with the desired pore size. Between the impervious plates 2 and the membrane plates 1 there are formed retentate passages 6. These retentate passages are connected to the channels for unfiltered fluid (formed by the openings 3) and to the channels for retentate (formed by the openings 5). The retentate passages are sealed against the channels for permeate (formed by the openings 4) by packings 7.

The permeate passages 8 are connected to the channels for permeate (formed by the openings 4) but sealed against the channel for unfiltered fluid by packings 9 and sealed against the channels for retentate by packings 10.

Both the retentate and permeate passages are sealed against the surrounding atmosphere by way of edge packings 11.

The impervious plates are provided with a corrugation pattern (not shown in the drawing) facing the retentate passage.

The unfiltered fluid enters the filter through the openings 3 and is divided into a number of parallel flows directed into the retentate passages 6. During the flow a part of the fluid passes the membrane in the membrane plates and enters the membrane passages 8. This flow, which has passed the membrane, leaves the membrane passages through the openings 5 forming the channel for permeate. The rest of the fluid leaves the retentate passages through the openings 5 forming the channel for retentate.

At the outlet from the permeate channel there is arranged a restriction (not shown in the drawing). With the aid of this restriction the permeate flow out from the filter may be throttled in a desired degree. Due to the restriction the permeate passages are kept filled with fluid the pressure of which may be controlled. The counterpressure over the membrane may then be kept at a desired degree.

The plates forming a filter according to the invention is shown in FIG. 3. From this drawing it may also be seen that the end plates in a separate filter section must be designed with a different number of openings than the plates within the filter section.

Figure 4:
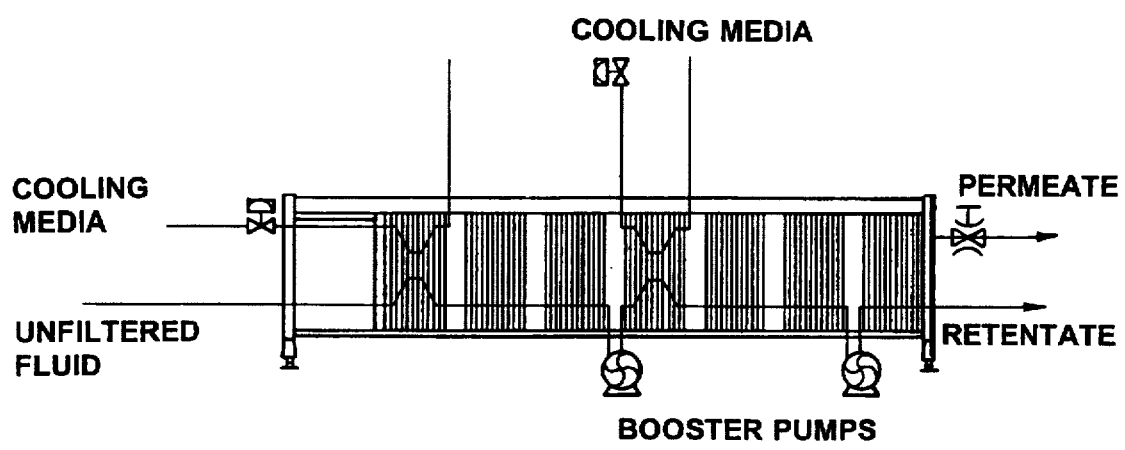

In FIG. 4 there is shown how a filter according to the invention may form part of a plant where the unfiltered fluid is cooled (see "cooling media") prior to the filtration and also during the same. The pressure of the fluid may also be increased during the passage through the filter, by using one or more conventional booster pumps, for example, a positive displacement pump or a centrifugal pump, if needed or desired.

Figure 5:
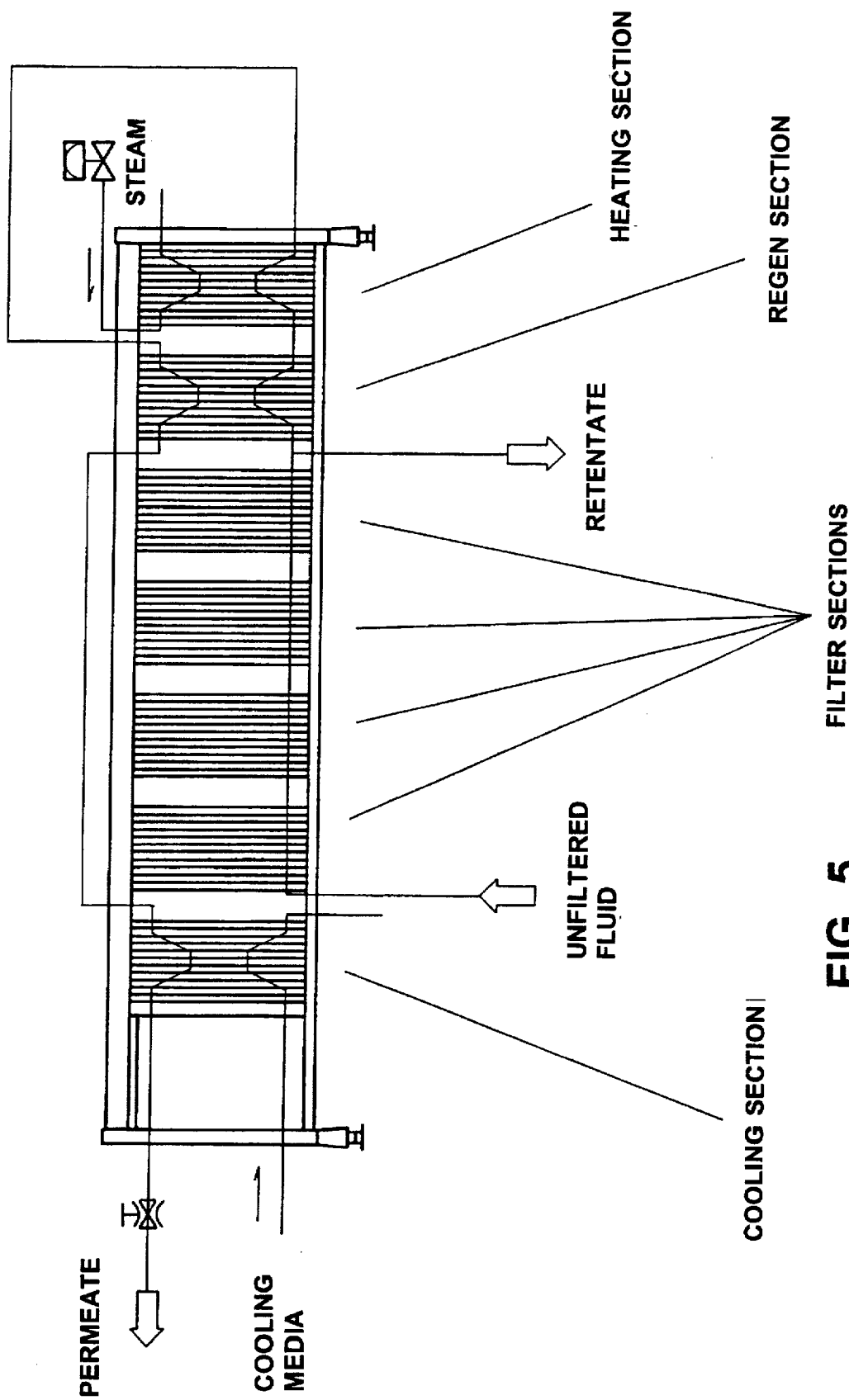

In FIG. 5 there is shown how a number of filter sections may be included in a plant where the permeate also is pasteurized (see "steam" and "heating section") while the retentate is removed after the filtering. FIG. 5 also shows a "cooling media" and a "cooling section" in this embodiment.

I claim:

1. A filter for cross-flow filtration of a fluid containing suspended or emulsified substances comprising:

a stack of equally dimensioned, spaced-apart plates, said stack comprising a series of impervious plates separated by membrane plates and defining a series of passages that are edge sealed by means of edge packing between adjacent plates, a first series of aligned openings through all of said plates defining an inlet channel extending through said stack, a second series of aligned openings through all of said plates defining a permeate collection channel, a third series of aligned openings through all of said plates defining a retentate collection channel, said membrane plates comprising a membrane material which is chemically and physically inert to the fluid, which membrane has a pore size of 0.1–50 µm, a first portion of said passages forming retentate passages and being defined by a membrane plate and an impervious plate and being in open communication with said inlet channel and said retentate collection channel but being sealed by packing from said permeate collection channel, and the remainder of said passages forming permeate passages and being in open communication with said permeate collection channel but being sealed by packing from said inlet channel and said retentate collection channel, wherein fluid communication between said inlet channel and said permeate collection channel is only through said membrane plates, a permeate outlet from said filter communicating with said permeate collection channel, a retentate outlet from said filter communicating with said retentate collection channel, said impervious plates being provided with a corrugation pattern increasing turbulence in the retentate passages, and said permeate outlet including a flow restriction, wherein in operation the permeate passages are kept filled with fluid.

2. Filter according to claim 1, wherein both the permeate (8) and the retentate (6) passages are formed between a membrane plate (1) and an impervious plate (2).

3. Filter according to claim 2, wherein the plate in which the membrane is a part is constructed with a thin membrane layer which constitutes the hindrance for the suspensed or emulsified substance/substances and a supporting structure with a larger pore size at which the plate is self supporting.

4. Filter according to claim 1, wherein the membrane material has a pore size of 0.2–10 µm.

5. Filter according to claim 4, wherein the membrane material consists of sintered stainless steel.

6. Filter according to claim 4, wherein the plates are tightened in a frame.

7. Filter according to claim 4, wherein the membrane part in the membrane plate is homogeneous all over its cross section.

8. Filter according to claim 1, wherein the membrane material consists of sintered metallic material, glass or poly-fluoroethylene.

9. Filter according to claim 1, wherein the plates have a square or rectangular shape and the openings are arranged in the edges of the square or rectangle.

10. Filter according to claim 1, wherein also the plates which comprise the membrane material are designed with a corrugation pattern.

11. Filter according to claim 1, wherein there are sections with membrane plates with different pore size of the membrane in the filter.

12. Filter according to claim 1, wherein the filter has at least one section for heating or for cooling the fluid in the filter.

13. Filter according to claim 1, wherein there are plates in the filter having connections to a booster pump, which pump increases the pressure of the fluid during the filtration.

* * * * *